United States Patent
Song et al.

(10) Patent No.: US 9,939,006 B2
(45) Date of Patent: Apr. 10, 2018

(54) SEALING SYSTEM FOR FASTENERS

(71) Applicant: The Boeing Company, Chicago, IL (US)

(72) Inventors: Weidong Song, Woodinville, WA (US); Daniel Joseph Perron, Federal Way, WA (US)

(73) Assignee: THE BOEING COMPANY, Chicago, IL (US)

( * ) Notice: Subject to any disclaimer, the term of this patent is extended or adjusted under 35 U.S.C. 154(b) by 25 days.

(21) Appl. No.: 14/882,645

(22) Filed: Oct. 14, 2015

(65) Prior Publication Data

US 2017/0108029 A1    Apr. 20, 2017

(51) Int. Cl.
| F16B 37/14 | (2006.01) |
| F16B 47/00 | (2006.01) |
| F16B 33/00 | (2006.01) |
| B64D 45/02 | (2006.01) |

(52) U.S. Cl.
CPC ............ *F16B 37/14* (2013.01); *F16B 33/004* (2013.01); *F16B 47/00* (2013.01); *B64D 45/02* (2013.01); *F16B 47/003* (2013.01)

(58) Field of Classification Search
CPC ................................. F16B 37/14; F16B 47/00
USPC ................... 411/372.5, 372.6, 373, 377, 431
See application file for complete search history.

(56) References Cited

U.S. PATENT DOCUMENTS

| 2,417,262 | A | * | 3/1947 | Morehouse | ........... F16B 33/004 |
| | | | | | 411/512 |
| 4,756,654 | A | * | 7/1988 | Clough | ............... F16B 37/0842 |
| | | | | | 411/429 |
| 5,044,852 | A | | 9/1991 | Sweeny et al. | |
| 5,048,898 | A | * | 9/1991 | Russell | ...................... B60B 7/00 |
| | | | | | 301/37.374 |
| 5,129,770 | A | * | 7/1992 | Coleman | ................... A47G 3/00 |
| | | | | | 411/373 |
| 5,642,973 | A | * | 7/1997 | Pretty | ..................... F16B 37/14 |
| | | | | | 411/373 |
| 5,810,532 | A | * | 9/1998 | Huang | .................... F16B 37/14 |
| | | | | | 411/377 |
| 6,135,691 | A | * | 10/2000 | Nadarajah | ............... F16B 37/14 |
| | | | | | 411/372.6 |
| 6,142,579 | A | * | 11/2000 | Thiel | ......................... B60B 7/00 |
| | | | | | 301/108.4 |
| 7,665,941 | B2 | * | 2/2010 | Wolf | ..................... E04B 1/4157 |
| | | | | | 411/429 |

(Continued)

FOREIGN PATENT DOCUMENTS

| EP | 2860411 A1 | 5/2015 |
| EP | 3059170 A1 | 8/2016 |

(Continued)

OTHER PUBLICATIONS

Gaw, "Foamed Energy Absorptive Fastener Seal Cap," U.S. Appl. No. 13/363,853, filed Feb. 1, 2012, 36 pages.

(Continued)

*Primary Examiner* — Flemming Saether
(74) *Attorney, Agent, or Firm* — Yee & Associates, P.C.

(57) ABSTRACT

A method and apparatus for sealing a fastener that extends through a surface. The apparatus comprises a housing having a base and cap, wherein the cap is configured to cover a portion of a fastener extending through a surface, and wherein the housing is configured to apply suction to the surface.

13 Claims, 7 Drawing Sheets

(56) References Cited

U.S. PATENT DOCUMENTS

| | | | |
|---|---|---|---|
| 8,002,508 B2* | 8/2011 | Reed | F16B 37/14 411/377 |
| 2007/0022703 A1 | 2/2007 | Wolf et al. | |
| 2010/0140437 A1* | 6/2010 | Orban | F16B 47/00 248/363 |
| 2011/0305539 A1* | 12/2011 | Rand | F16B 37/14 411/373 |
| 2016/0076577 A1* | 3/2016 | Rizzello | F16B 11/006 411/82 |
| 2017/0008636 A1 | 1/2017 | Gaw | |
| 2017/0108029 A1 | 4/2017 | Song et al. | |

FOREIGN PATENT DOCUMENTS

| | | |
|---|---|---|
| RU | 2383786 C2 | 3/2010 |
| RU | 2531113 C2 | 10/2014 |
| WO | WO9729289 A1 | 8/1997 |

OTHER PUBLICATIONS

Song, "In-Situ Injection Molded Fastener Cap Seal Using Thermoplastic Elastomer Materials," U.S. Appl. No. 14/543,253, filed Nov. 17, 2014, 16 pages.

"Sealants and Sealing Introduction," "M" Level3.com, Aircraft Sealants—Information for maintenance engineer students, pp. 1-21, accessed Jan. 3, 2012 http://www.mlevel3.com/BCIT/Sealants.htm.

Wicklund, Federal Aviation Administration Memorandum, "Policy on Issuance of Special Conditions and Exemptions Related to Lightning Protection of Fuel Tank Structure," Policy Reference AC25.981-1C, May 2009, pp. 1-16.

"Flying High," ASI Adhesives Magazine, Sep. 2005, pp. 1-3.

Extended European Search Report, dated Mar. 15, 2017, regarding Application No. 16193123.3, 8 pages.

Federal Service for Intellectual Property Office Action, dated Sep. 14, 2017, regarding Application No. 2016123451/11(036724), 13 pages.

* cited by examiner

SEALING SYSTEM FOR FASTENERS

BACKGROUND INFORMATION

1. Field

The present disclosure relates generally to protection for fasteners. In particular, the present disclosure relates to a method and apparatus for sealing fasteners.

2. Background

In composite structures, the sealing of metal surfaces and the holes that penetrate the structure may have a number of purposes, including the reduction of fuel leakage, with respect to fuel leaking out of the tank, the reduction of other fluids entering or exiting the fuel tank, the coverage of metal components that can have a propensity to accumulate electrical charge, or the prevention of galvanic corrosion.

Components, such as metallic fasteners, may be sealed. Sealant in the form of seal caps may cover these fasteners. A "seal cap" is a structure that covers an end of a metallic component. The metallic component may be a fastener. The end may be the head fastener or the threaded end of the fastener with a nut. The fastener may be, for example, a bolt, a screw, or some other type of fastener.

For example, a seal cap may be attached to the end of a fastener that extends into the interior of the fuel tank. This seal cap is configured to provide a seal against the flow of fuel out of the fuel tank. The seal cap may also reduce or eliminate the accumulation of electrical charge on the surface of the exposed fastener.

Seal caps are often comprised of materials that retain sealing properties when submerged in fuel and/or when left dry for different periods of time. For example, molded polymeric seal caps may be used in fuel tanks for aircraft. These types of seal caps may fit over the protruding end of a fastener on the interior of the fuel tank. Sealants may be placed into the seal caps prior to the seal caps being placed on the fastener. The sealant may be in the form of a plastic forming material.

For example, a seal cap may have an interior that is partially filled with an uncured sealant. This seal cap with the sealant is then pressed into place on the fastener. When in this position, excess sealant extrudes from around the bottom of the cap. This sealant may be blended around and onto the exterior of the cap. The sealant is then allowed to cure to form the final sealant material.

However, installing molded seal caps may take an undesirable amount of time. For example, molded seal caps may be placed over fasteners manually. Manual installation may take an undesirable amount of time. Further, molded seal caps may be manually inspected for voids prior to installation over fasteners. Yet further, blending extruded sealant may be performed manually and require training to meet desired tolerances.

Therefore, it would be desirable to have a method and apparatus that take into account at least some of the issues discussed above, as well as possibly other issues.

SUMMARY

In one illustrative embodiment, an apparatus is provided. The apparatus comprises a housing. The housing has a base and a cap. The cap is configured to cover a portion of a fastener extending through a surface. The housing is configured to apply suction to the surface.

A further illustrative embodiment of the present disclosure provides an apparatus. The apparatus comprises a surface, a fastener, and a housing. The fastener has an end extending from the surface. The housing covers the end of the fastener. The housing is formed of a flexible material selected to apply suction to the surface after pressing the housing against the fastener. The housing includes a base and a cap.

A yet further illustrative embodiment of the present disclosure provides a method of sealing a fastener that extends through a surface. A housing is pressed over an end of the fastener such that a portion of the housing conforms to a portion of the fastener. The housing includes a base and a cap. The housing is held over the fastener with suction applied by the housing to the surface.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

DETAILED DESCRIPTION

The different illustrative embodiments recognize and take into account one or more considerations. For example, the illustrative embodiments recognize and take into account that fuel tanks in aircraft are often integral structures to the aircraft. For example, the wing structure of an aircraft may be sealed. The internal cavities of the sealed wing structure may be used as a fuel tank. These types of wings are also referred to as "wet wings."

The illustrative embodiments recognize and take into account that with a wet wing, components, such as fasteners, hoses, tubing, or other components that extend into the wing, can be sealed to exclude the outside from the inside, or covered to reduce or eliminate the buildup of electrical charge on conductive surfaces. These components can extend through structures within the fuel tank, such as stringers, or between bays of the fuel tank via holes in the structures forming the fuel tank, such as ribs or other supporting structures. In conventional fuel tanks made from metal, components and the holes through which they extend may be sealed to reduce leaking or seepage of the fuel tank formed in the wing.

The illustrative embodiments also recognize and take into account that currently used sealing systems may employ seal caps that are configured to reduce the transfer of energy into a fuel tank system caused by an electromagnetic event. The transfer of energy may involve a spark, a static discharge, a gas under pressure, a heated gas, a mechanical force, or some other transfer of energy that may be undesirable within a fuel tank system.

The illustrative embodiments also recognize and take into account that seal caps may add an undesired amount of time to manufacturing the structure. Yet further, the illustrative embodiments recognize and take into account that a fuel tank system may have restricted space. Movement within the fuel tank system may be limited by the size of the fuel tank system. Further, the distances between a number of fasteners in the fuel tank system may be small. The illustrative embodiments recognize and take into account that an apparatus for applying sealant in a fuel tank system should be sufficiently compact to move within the fuel tank system. Thus, the illustrative embodiments provide a method and apparatus for reducing manufacturing time for sealing fasteners in a fuel tank system, reducing a transfer of energy in a fuel tank system, or a combination of the two.

An illustrative embodiment of the present disclosure may provide a fuel tank system. The fuel tank system may comprise a fuel tank, a number of fasteners, and a number of housings. The number of fasteners may have a number of ends extending into an interior of the fuel tank. The number of housings is configured to cover the number of ends of the number of fasteners. A housing in the number of housings is configured to cover an end of a fastener in the number of ends. The housing has a base and a cap. The housing is formed of a flexible material selected to apply suction to the fuel tank after the housing has been pressed against the fastener.

Figure 1:
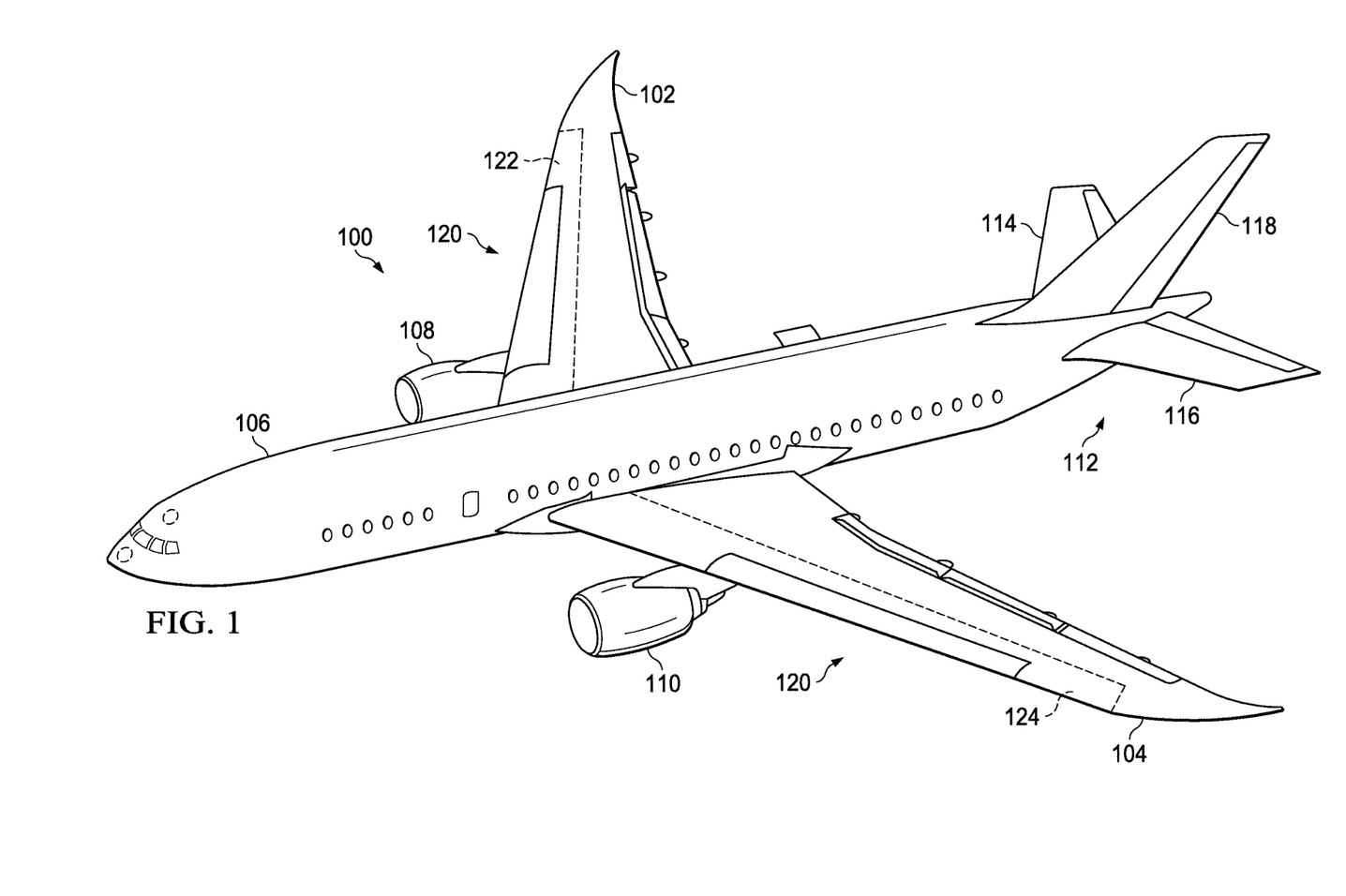
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106. As depicted, aircraft 100 also includes fuel tank system 120. As depicted, fuel tank system 120 includes fuel tank 122 and fuel tank 124.

Fuel tank 122 is located in wing 102, and fuel tank 124 is located in wing 104 in fuel tank system 120. In these illustrative examples, fuel tank 122 and fuel tank 124 are formed by sealing structures inside of wing 102 and wing 104, respectively. A sealing system for fasteners in fuel tank system 120 may be implemented in accordance with an illustrative embodiment.

Figure 2:
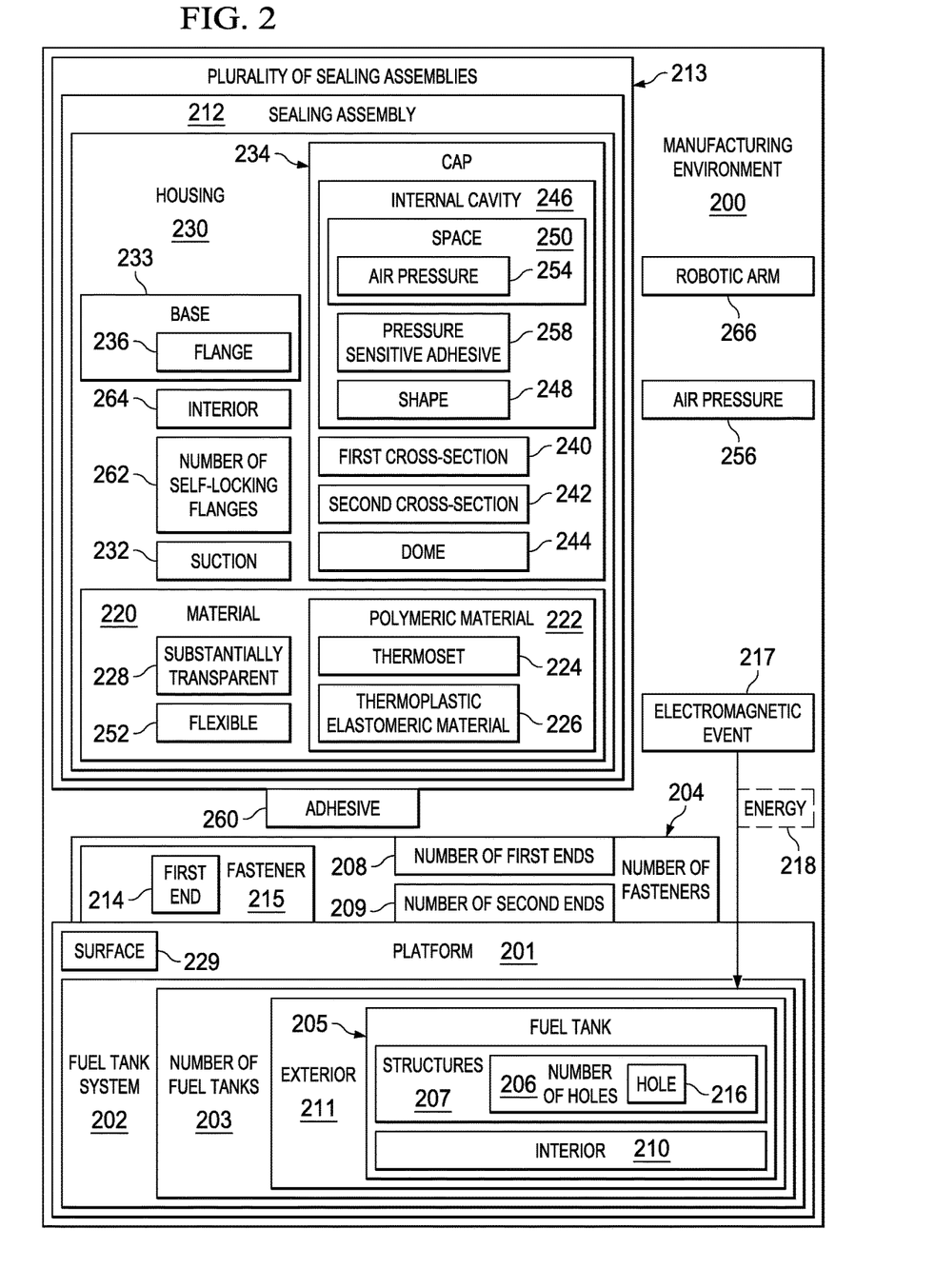
FIG. 2 is an illustration of a block diagram of a manufacturing environment in accordance with an illustrative embodiment.

With reference next to FIG. 2, an illustration of a block diagram of a manufacturing environment is depicted in accordance with an illustrative embodiment. In this illustrative example, manufacturing environment 200 may be used to seal fasteners in platform 201. Aircraft 100 of FIG. 1 is an example of a physical implementation of platform 201 in FIG. 2.

Platform 201 may include fuel tank system 202. Fuel tank system 120 in FIG. 1 is an example of an implementation for fuel tank system 202 in FIG. 2. Fuel tank system 202 includes number of fuel tanks 203. As used herein, a "number of," when used with reference to items, means one or more items. For example, "number of fuel tanks 203" is one or more fuel tanks. Fuel tank 122 and fuel tank 124 in FIG. 1 are examples of fuel tanks that may be in number of fuel tanks 203. A fuel tank in number of fuel tanks 203 also may be in locations other than in wing 102 and wing 104 of aircraft 100. For example, a fuel tank may be located in body 106 of aircraft 100.

In some illustrative examples, number of fasteners 204 may be installed in fuel tank 205 in number of fuel tanks 203. In particular, number of fasteners 204 may be installed in number of holes 206 formed in structures 207. Structures 207 may be structures forming or supporting fuel tank 205. Structures 207 may include at least one of a number of ribs, a number of spars, a number of skins, or other structures. Number of fasteners 204 may have a large quantity of fasteners. For example, number of fasteners 204 may include between 20,000 and 80,000 fasteners. When number of fasteners 204 includes a large quantity of fasteners, even small increases in time for an individual fastener related to manufacturing, sealing, or inspecting may increase overall manufacturing time by a large amount of time.

Number of fasteners 204 has number of first ends 208 and number of second ends 209. Number of first ends 208 may extend into interior 210 of fuel tank 205. In these illustrative examples, number of second ends 209 is on exterior 211 of fuel tank 205.

In this illustrative example, sealing assembly 212 may be used in fuel tank 205 in number of fuel tanks 203. Sealing assembly 212 may be one of plurality of sealing assemblies 213.

Plurality of sealing assemblies 213 may be used to seal number of fasteners 204 installed in fuel tank 205. More particularly, plurality of sealing assemblies 213 may be used to seal number of holes 206 in structures 207 of fuel tank 205 with number of fasteners 204 installed in number of holes 206.

In particular, sealing assembly 212 may be used to seal a fastener in number of fasteners 204 installed in fuel tank 205. More specifically, sealing assembly 212 may be used to seal a hole in number of holes 206 in structures 207 of fuel tank 205 with number of fasteners 204 installed in number of holes 206.

Sealing assembly 212 may be designed for covering first end 214 of fastener 215. In some illustrative examples, sealing assembly 212 may be the same as other sealing assemblies of plurality of sealing assemblies 213. In other illustrative examples, sealing assembly 212 may be different from other sealing assemblies of plurality of sealing assemblies 213.

For example, plurality of sealing assemblies 213 may be designed to seal number of first ends 208 of number of fasteners 204. In some illustrative examples, number of fasteners 204 may be of a variety of sizes. For example, number of fasteners 204 may have a variety of diameters. Plurality of sealing assemblies 213 may have a variety of at least one of shapes or sizes to desirably seal number of fasteners 204 having a variety of diameters.

As another example, number of first ends 208 may have a variety of lengths. Plurality of sealing assemblies 213 may have a variety of at least one of shapes or sizes to desirably cover and seal number of first ends 208 of number of fasteners 204.

As depicted, sealing assembly 212 may be configured to cover first end 214 of fastener 215 in number of fasteners 204. Sealing assembly 212 may form a barrier between first end 214 of fastener 215 and interior 210 of fuel tank 205.

First end 214 of fastener 215 is an end within number of first ends 208 that extends into interior 210 of fuel tank 205 from structures 207. In these illustrative examples, fastener 215 is installed in hole 216 within number of holes 206 in fuel tank 205.

In the illustrative examples, sealing assembly 212 is configured to reduce effects resulting from electromagnetic event 217. In particular, sealing assembly 212 may be configured to reduce the transfer of energy 218 into or within interior 210 of fuel tank 205. The transfer of energy 218 may be into interior 210 of fuel tank 205 from current caused by electromagnetic event 217. The transfer of energy 218 may be within interior 210 of fuel tank 205 from electrostatic charge that builds up on metal components within interior 210 of fuel tank 205.

In the illustrative examples, electromagnetic event 217 may be, for example, without limitation, a lightning strike, electrostatic discharge, or other types of discharge for platform 201. Electromagnetic event 217 may transfer energy 218 to platform 201.

In these illustrative examples, energy 218 may take a number of different forms. For example, energy 218 may be at least one of a spark, an electrostatic discharge, heat, a mechanical force, a moving particle, or some other form of energy that may be undesirable within interior 210 of fuel tank 205. As used herein, the phrase "at least one of," when used with a list of items, means different combinations of one or more of the listed items may be used, and only one of each item in the list may be needed. For example, "at least one of item A, item B, and item C" may include, without limitation, item A, or item A and item B. This example also may include item A, item B, and item C, or item B and item C.

In an illustrative example, energetic particles may originate from one or more of number of first ends 208 of number of fasteners 204 in response to electromagnetic event 217. In the illustrative examples, sealing assembly 212 is configured to reduce and/or prevent energy 218 from being transferred into or within interior 210 of fuel tank 205. Sealing assembly 212 is configured to contain energy 218, absorb energy 218, or a combination of the two. By containing energy 218, absorbing energy 218, or a combination of the two, the amount of energy 218 reaching interior 210 of fuel tank 205 may be reduced, prevented, or both. In these illustrative examples, containing energy 218 means that the amount of energy 218 reaching interior 210 of fuel tank 205 is reduced, prevented, or both.

Material 220 of sealing assembly 212 may be selected to provide desirable characteristics. In the illustrative examples, material 220 of sealing assembly 212 may be selected as one that does not retain undesired amounts of electric charges. Material 220 of sealing assembly 212 may be selected as one that is electrostatically conductive. In some illustrative examples, material 220 may be polymeric material 222. In some illustrative examples, when material 220 is polymeric material 222, sealing assembly 212 may be thermoset 224 or thermoplastic elastomeric material 226.

A thermoset material may become hard when heated. A thermoplastic material may become soft upon heating and may harden upon cooling. A thermoplastic material may be able to be repeatedly heated and cooled.

As another example, material 220 of sealing assembly 212 may be selected as having properties configured to contain energy 218 in the form of thermal energy. The thermal energy may be, for example, in the form of a spark or heated gas.

Material 220 of sealing assembly 212 may be selected for desirable inspection or application properties. For example, material 220 of sealing assembly 212 may be selected such that sealing assembly 212 is substantially transparent 228 after curing. When sealing assembly 212 is substantially transparent 228 after curing, sealing assembly 212 may be visually inspected for voids.

Number of fasteners 204 may extend through surface 229 of platform 201. When number of fasteners 204 is present in fuel tank system 202, fastener 215 may extend through surface 229 in fuel tank system 202.

Although number of fasteners 204 has been discussed as being present in fuel tank system 202, number of fasteners 204 may be used in other locations other than fuel tank system 202. In these other illustrative examples, surface 229 may be any desirable surface other than inside fuel tank system 202. For example, surface 229 may be an exterior surface of platform 201. In another illustrative example, surface 229 may be an interior surface of platform 201.

Sealing assembly 212 takes the form of housing 230. Housing 230 is formed prior to installation over a fastener. Housing 230 may be formed using injection molding, thermos-molding, or any other desirable form of manufacturing.

Housing 230 may be positioned such that housing 230 covers first end 214 of fastener 215 extending from surface 229. Housing 230 is configured to apply suction 232 to surface 229. Housing 230 has base 233 and cap 234. Base 233 may take the form of flange 236. When sealing assembly 212 is assembled over fastener 215, base 233 contacts surface 229 of platform 201.

Cap 234 is configured to cover a portion of fastener 215 extending through surface 229. More specifically, cap 234 may cover first end 214 of fastener 215. Cap 234 has first cross-section 240 and second cross-section 242. First cross-section 240 is closer to base 233 of housing 230 than second cross-section 242. First cross-section 240 is larger than second cross-section 242.

In some illustrative examples, cap 234 may be referred to as dome 244. In some illustrative examples, dome 244 may have a generally rounded end. In other illustrative examples, dome 244 may have a substantially flat end. In some illustrative examples, dome 244 may be substantially conical.

Cap 234 has internal cavity 246. Internal cavity 246 may be designed to cover first end 214 of fastener 215. Shape 248 of internal cavity 246 may be designed based on fastener 215. Shape 248 of internal cavity may be designed based on at least one of the size, shape, or length of first end 214 of fastener 215.

Internal cavity 246 may be designed such that a portion of internal cavity 246 contacts fastener 215 when sealing assembly 212 is assembled over fastener 215. Internal cavity 246 may be designed such that space 250 between internal cavity 246 and fastener 215 is desirable. Space 250 may be a total amount of volume between internal cavity 246 of cap 234 and fastener 215. For example, it may be desirable to minimize space 250 within internal cavity 246 when sealing assembly 212 is installed over fastener 215.

Sealing assembly 212 may be positioned over fastener 215. After positioning sealing assembly 212 over fastener 215, pressure may be applied to cap 234 to press housing 230 over first end 214 of fastener 215 such that a portion of housing 230 conforms to a portion of fastener 215.

When housing 230 is pressed over first end 214 of fastener 215, housing 230 is held over fastener 215 by suction 232 applied by housing 230 to surface 229. Housing 230 may be described as acting as a suction cup.

Material 220 of housing 230 may be flexible 252 such that housing 230 acts as a suction cup. When material 220 of housing 230 is flexible 252, a portion of cap 234 may conform to a portion of fastener 215.

When housing 230 is held against surface 229 by suction 232, air pressure 254 within space 250 is lower than air pressure 256 outside of housing 230. When air pressure 254 is lower than air pressure 256, air pressure 254 may be referred to as negative pressure. Air pressure 256 outside of housing 230 may be about atmospheric pressure. In some illustrative examples, space 250 may be referred as a space within housing 230. In other illustrative examples, space 250 may be referred to as a space between housing 230 and surface 229.

When air pressure 254 is lower than air pressure 256 outside of housing 230, housing 230 may have desirable characteristics during operation of platform 201. For example, when platform 201 is an aircraft such as aircraft 100 of FIG. 1, air pressure 256 may be lower when the aircraft is flying than when the aircraft is on the ground. As air pressure 256 lowers below atmospheric pressure, housing 230 may still have suction 232. If air pressure 254 and air pressure 256 were both about atmospheric pressure, housing 230 may come off of fastener 215 as air pressure 256 decreases during flight.

When platform 201 is an aircraft, air within housing 230 will expand when the aircraft is at a cruising altitude. If air pressure 254 was atmospheric pressure, the air inside housing 230 may expand during flight and push against housing 230. By pushing against housing 230, the air inside housing 230 may break the seal of housing 230. By air pressure 254 being lower than air pressure 256, the air within housing 230 may not provide an undesirable amount of pressure against housing 230.

In some illustrative examples, suction 232 alone may hold housing 230 over fastener 215. In some other illustrative examples, additional holding components may hold housing 230 over fastener 215. For example, pressure sensitive adhesive 258 may be present in internal cavity 246. When pressure sensitive adhesive 258 is present, both pressure sensitive adhesive 258 and suction 232 may hold housing 230 in place over fastener 215.

Pressure sensitive adhesive 258 may be a permanent or temporary adhesive. For example, pressure sensitive adhesive 258 may continue to hold housing 230 in place over fastener 215 throughout use of platform 201. In other illustrative examples, pressure sensitive adhesive 258 may temporarily hold housing 230 in place over fastener 215. In one example, adhesive 260 may be present between base 233 and surface 229. In this example, pressure sensitive adhesive 258 may hold housing 230 in place as adhesive 260 cures. After adhesive 260 is cured, at least one of adhesive 260 and suction 232 may hold housing 230 in place over fastener 215. For example, adhesive 260 may be the primary component holding housing 230 in place over fastener 215. Adhesive 260 may be optional.

In some illustrative examples, sealing assembly 212 may further include number of self-locking flanges 262. Number of self-locking flanges 262 may also be formed of material 220. Number of self-locking flanges 262 may extend from housing 230 into interior 264 of housing 230. Pressing housing 230 over first end 214 of fastener 215 may include applying housing 230 such that number of self-locking flanges 262 engage fastener 215.

In some illustrative examples, number of self-locking flanges 262 may provide supplementary holding for housing 230. In some illustrative examples, number of self-locking flanges 262 may provide primary holding for housing 230. In some illustrative examples, number of self-locking flanges 262 may be used in conjunction with other holding components such as at least one of suction 232, pressure sensitive adhesive 258, or adhesive 260.

Number of self-locking flanges 262 may center housing 230 relative to fastener 215. By centering housing 230 relative to fastener 215, number of self-locking flanges 262 may minimize space 250.

In other illustrative examples, material 220 may provide holding for housing 230. For example, when base 233 is formed of thermoplastic elastomeric material 226, base 233 may be heated. By heating base 233, thermoplastic elastomeric material 226 may become pliable and sticky. By heating base 233, thermoplastic elastomeric material 226 may bond to surface 229.

Sealing assembly 212 may be installed over fastener 215 in any desirable fashion. In some illustrative examples, sealing assembly 212 may be pressed onto fastener 215 manually. In another illustrative example, robotic arm 266 may move sealing assembly 212 within fuel tank system 202. Robotic arm 266 may install sealing assembly 212 onto a fastener in number of fasteners 204, such as fastener 215.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, each of number of self-locking flanges 262, adhesive 260, and pressure sensitive adhesive 258 may be optional. In some illustrative examples, sealing assembly 212 may include at least one of heated thermoplastic elastomeric material 226 of base 233, number of self-locking flanges 262, adhesive 260, or pressure sensitive adhesive 258. Further, in some illustrative examples, sealing assembly 212 may include none of heated thermoplastic elastomeric material 226 of base 233, number of self-locking flanges 262, adhesive 260, or pressure sensitive adhesive 258.

Figure 3:
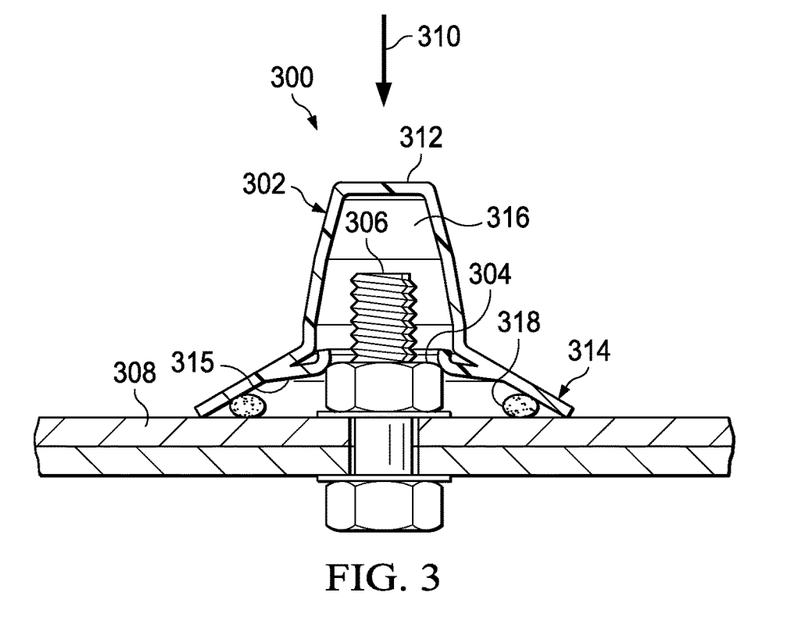
FIG. 3 is an illustration of a cross-sectional view of a sealing assembly in accordance with an illustrative embodiment.

Turning now to FIG. 3, an illustration of a cross-sectional view of a sealing assembly is depicted in accordance with an illustrative embodiment. Sealing assembly 300 may be a physical implementation of sealing assembly 212 of FIG. 2. Sealing assembly 300 includes housing 302 placed over fastener 304. First end 306 of fastener 304 extends through surface 308. As depicted, housing 302 is in an uninstalled position. To seal fastener 304 using housing 302, housing 302 may be pressed in direction 310 onto fastener 304.

When housing 302 is pressed in direction 310, housing 302 may be placed into an installed position.

Housing 302 includes cap 312 and base 314. As depicted, number of self-locking flanges 315 extends from housing 302 into interior 316 of housing 302. Additionally, adhesive 318 is positioned between base 314 and surface 308.

When housing 302 is pressed in direction 310, suction created by housing 302 may hold housing 302 in place relative to surface 308 and fastener 304 while adhesive 318 cures. When housing 302 is installed over fastener 304, at least one of number of self-locking flanges 315, adhesive 318, or suction may hold housing 302 in place relative to surface 308 and fastener 304.

Figure 4:
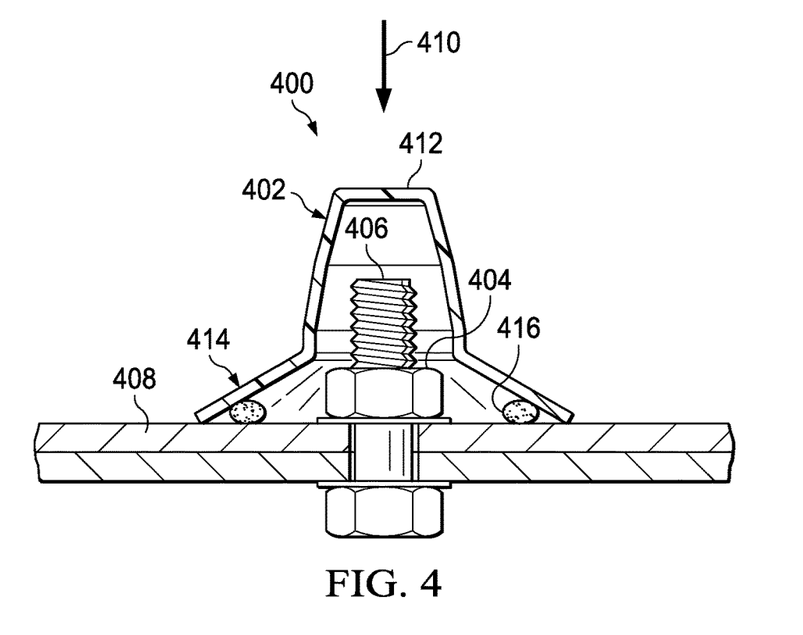
FIG. 4 is an illustration of a cross-sectional view of a sealing assembly in accordance with an illustrative embodiment.

Turning now to FIG. 4, an illustration of a cross-sectional view of a sealing assembly is depicted in accordance with an illustrative embodiment. Sealing assembly 400 may be a physical implementation of sealing assembly 212 of FIG. 2. Sealing assembly 400 includes housing 402 placed over fastener 404. First end 406 of fastener 404 extends through surface 408. As depicted, housing 402 is in an uninstalled position. To seal fastener 404 using housing 402, housing 402 may be pressed in direction 410 onto fastener 404.

Housing 402 includes cap 412 and base 414. As depicted, adhesive 416 is positioned between base 414 and surface 408.

When housing 402 is pressed in direction 410, suction created by housing 402 may hold housing 402 in place relative to surface 408 and fastener 404 while adhesive 416 cures. When housing 402 is installed over fastener 404, at least one of adhesive 416 or suction may hold housing 402 in place relative to surface 408 and fastener 404.

Figure 5:
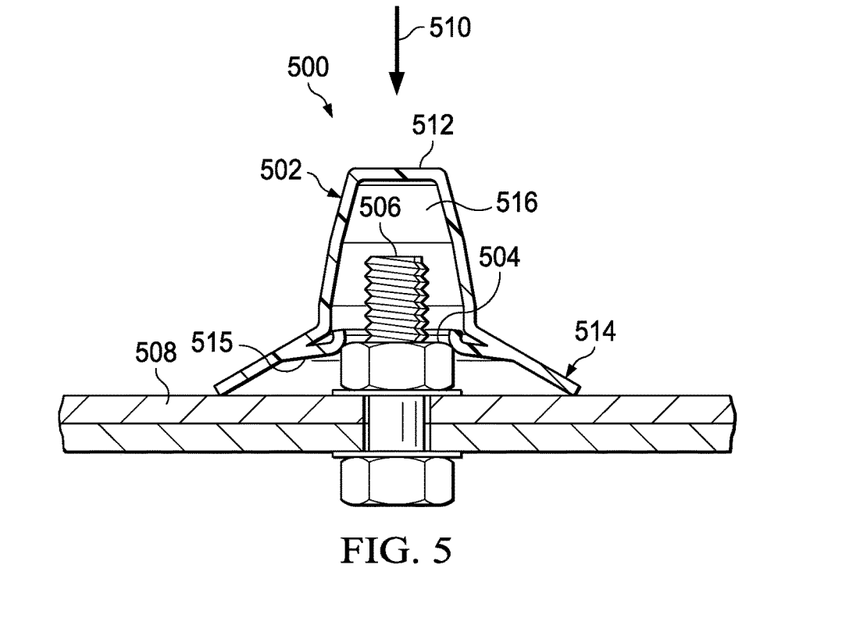
FIG. 5 is an illustration of a cross-sectional view of a sealing assembly in accordance with an illustrative embodiment.

Turning now to FIG. 5, an illustration of a cross-sectional view of a sealing assembly is depicted in accordance with an illustrative embodiment. Sealing assembly 500 may be a physical implementation of sealing assembly 212 of FIG. 2. Sealing assembly 500 includes housing 502 placed over fastener 504. First end 506 of fastener 504 extends through surface 508. As depicted, housing 502 is in an uninstalled position. To seal fastener 504 using housing 502, housing 502 may be pressed in direction 510 onto fastener 504.

Housing 502 includes cap 512 and base 514. As depicted, number of self-locking flanges 515 extends from housing 502 into interior 516 of housing 502. When housing 502 is installed over fastener 504, at least one of number of self-locking flanges 515 or suction may hold housing 502 in place relative to surface 508 and fastener 504.

Figure 6:
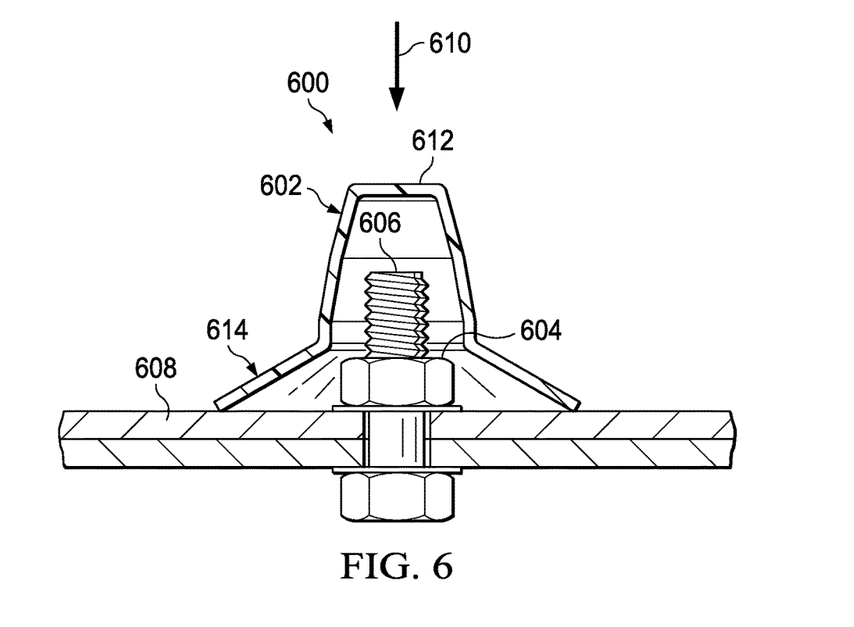
FIG. 6 is an illustration of a cross-sectional view of a sealing assembly in accordance with an illustrative embodiment.

Turning now to FIG. 6, an illustration of a cross-sectional view of a sealing assembly is depicted in accordance with an illustrative embodiment. Sealing assembly 600 may be a physical implementation of sealing assembly 212 of FIG. 2. Sealing assembly 600 includes housing 602 placed over fastener 604. First end 606 of fastener 604 extends through surface 608. As depicted, housing 602 is in an uninstalled position. To seal fastener 604 using housing 602, housing 602 may be pressed in direction 610 onto fastener 604.

Housing 602 includes cap 612 and base 614. When housing 602 is pressed in direction 610, suction created by housing 602 may hold housing 602 in place relative to surface 608 and fastener 604.

Figure 7:
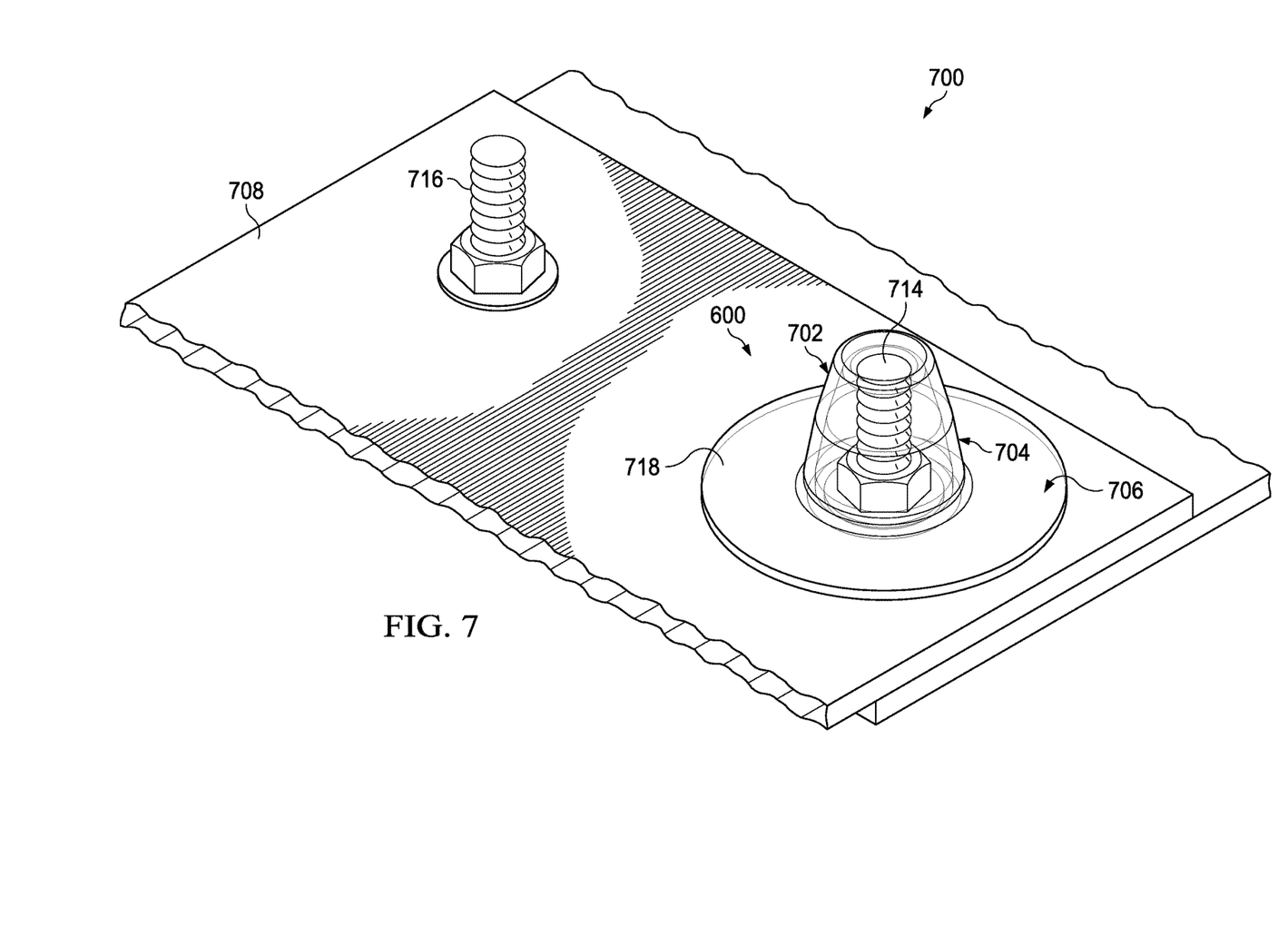
FIG. 7 is an illustration of an isometric view of an installed sealing assembly in accordance with an illustrative embodiment.

Turning now to FIG. 7, an illustration of an isometric view of an installed sealing assembly is depicted in accordance with an illustrative embodiment. Installed sealing assembly 700 may be a physical implementation of sealing assembly 212 of FIG. 2. Installed sealing assembly 700 may be an example of either sealing assembly 400 of FIG. 4 or sealing assembly 600 of FIG. 6 in an installed state.

Installed sealing assembly 700 includes housing 702, having cap 704 and base 706. In this installed state, base 706 is substantially flat against surface 708.

Installed sealing assembly 700 may be held in place over fastener 714 by at least one of suction or adhesive positioned between base 706 and surface 708. As depicted, fastener 716 is not yet sealed. In some illustrative examples, a sealant assembly substantially the same as installed sealing assembly 700 may be used to seal fastener 716. In other illustrative examples, fastener 714 and fastener 716 may be different. For example, a length of fastener 716 extending from surface 708 may be greater than a length of fastener 714 extending from surface 708. In another illustrative example, fastener 714 and fastener 716 may have different diameters. When fastener 714 and fastener 716 are different, a sealing assembly to seal fastener 716 may be different than sealing assembly 700. For example, at least one of the base size, cap shape, interior cavity shape, or other desirable characteristic of the sealing assembly may be different from sealing assembly 700.

As depicted, housing 702 of sealing assembly 700 is transparent 718. When housing 702 is transparent 718, inspection of housing 702 may be faster than if housing 702 were not transparent 718. For example, out of tolerance conditions may be visible through housing 702 when housing 702 is transparent 718.

Figure 8:
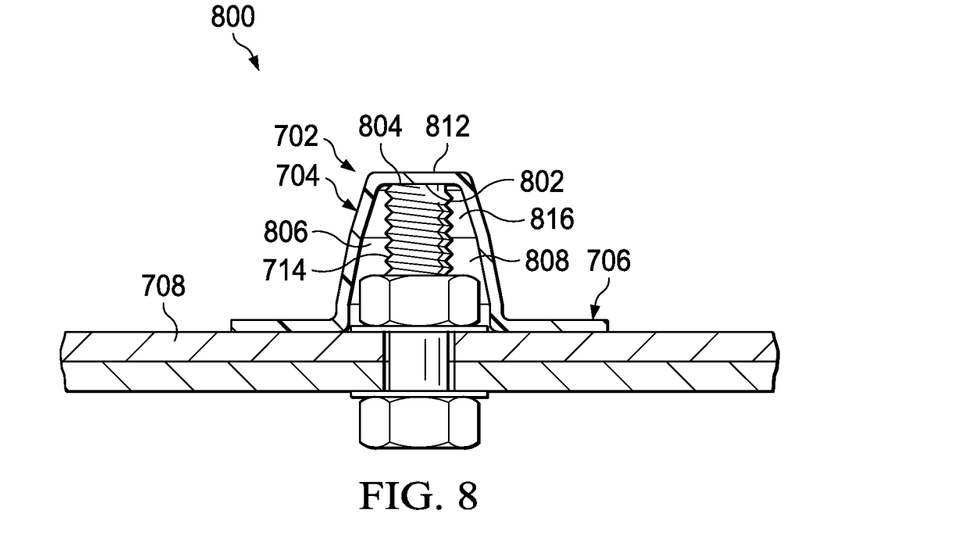
FIG. 8 is an illustration of a cross-sectional view of an installed sealing assembly in accordance with an illustrative embodiment.

Turning now to FIG. 8, an illustration of a cross-sectional view of an installed sealing assembly is depicted in accordance with an illustrative embodiment. View 800 may be a cross-sectional view of sealing assembly 700 along 8 of FIG. 7.

As depicted, portion 802 of housing 702 contacts portion 804 of fastener 714. Space 806 between housing 702 and surface 708 is desirably small. Minimizing space 806 may also minimize the amount of air within interior cavity 808 of cap 704. Space 806 within interior cavity 808 of cap 704 also desirably has an air pressure below atmospheric pressure.

The different components shown in FIGS. 1 and 3-8 may be combined with components in FIG. 2, used with components in FIG. 2, or a combination of the two. Additionally, some of the components in FIGS. 1 and 3-8 may be illustrative examples of how components shown in block form in FIG. 2 can be implemented as physical structures.

Figure 9:
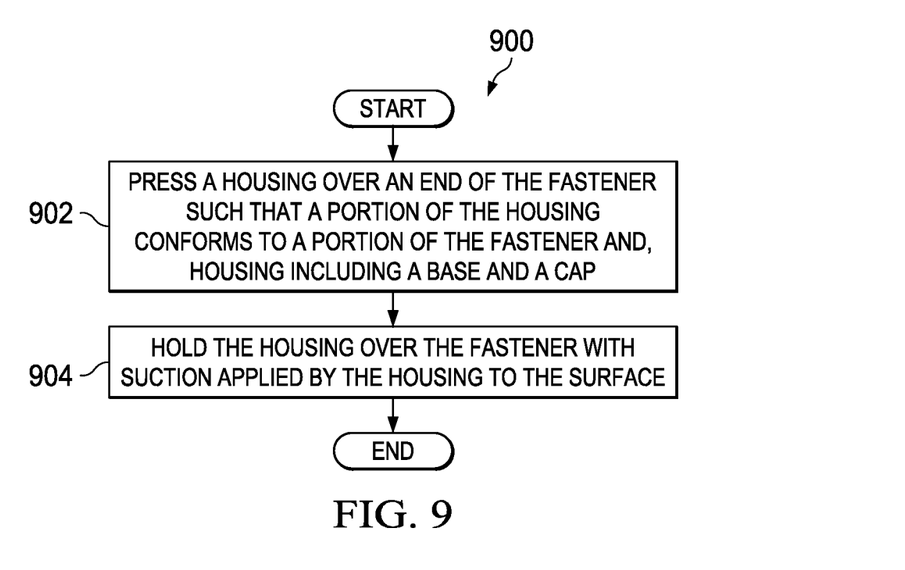
FIG. 9 is an illustration of a flowchart of a method for sealing a fastener that extends through a surface in accordance with an illustrative embodiment.

Turning now to FIG. 9, an illustration of a flowchart of a method of sealing a fastener that extends through a surface is depicted in accordance with an illustrative embodiment. Process 900 may be a process of sealing fastener 215 of FIG. 2. Process 900 may be a process of sealing a fastener in aircraft 100 of FIG. 1.

Process 900 may press a housing over an end of the fastener such that a portion of the housing conforms to a portion of the fastener, the housing including a base and a cap (operation 902). In some illustrative examples, pressing the housing over the end of the fastener comprises applying the housing over the end of the fastener such that a space between the housing and the surface has a lower air pressure than an air pressure outside of the housing.

In some illustrative examples, a number of self-locking flanges extend from the housing into an interior of the housing, and pressing the housing over the end of the fastener comprises applying the housing such that the number of self-locking flanges engages the fastener. In some illustrative examples, the number of self-locking flanges engaging the fastener holds the housing relative to the fastener while an adhesive between the housing and the surface cures.

Process 900 may then hold the housing over the fastener with suction applied by the housing to the surface (operation 904). Afterwards the process terminates. In some illustrative examples, the suction holds the housing relative to the fastener while an adhesive between the housing and the surface cures.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the Figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Further, some blocks may not be implemented. For example, Process 900 may further comprise applying an adhesive to the base of the housing.

Figure 10:
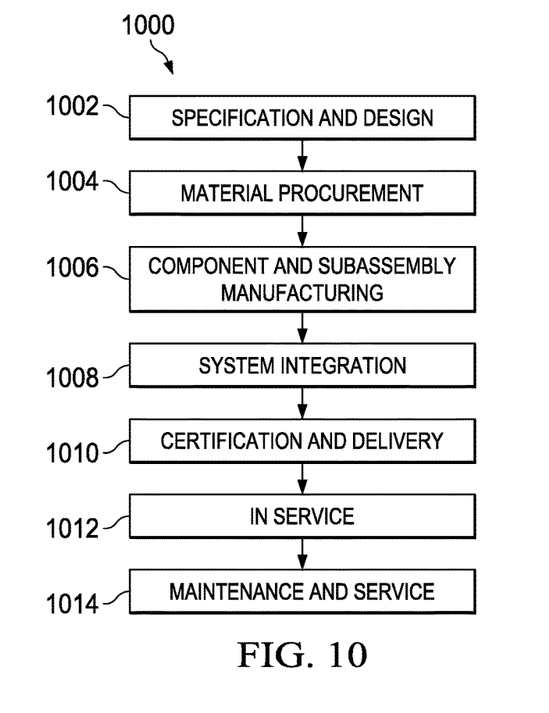
FIG. 10 is an illustration of an aircraft manufacturing and service method in the form of a block diagram in accordance with an illustrative embodiment.
Figure 11:
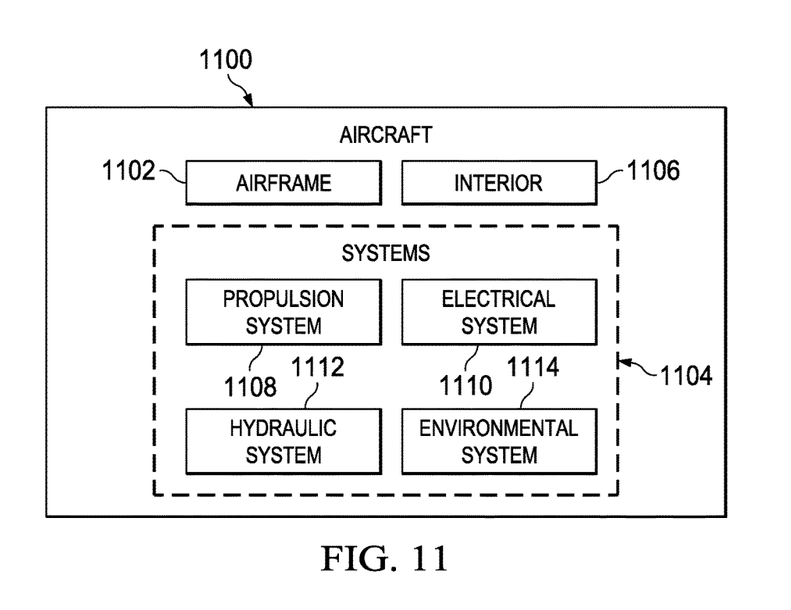
FIG. 11 is an illustration of an aircraft in the form of a block diagram, in which an illustrative embodiment may be implemented.

The illustrative embodiments of the disclosure may be described in the context of aircraft manufacturing and service method 1000 as shown in FIG. 10 and aircraft 1100 as shown in FIG. 11. Turning first to FIG. 10, an illustration of a block diagram of an aircraft manufacturing and service method is depicted in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 takes place. Thereafter, aircraft 1100 in FIG. 11 may go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of a block diagram of an aircraft is depicted in which an illustrative embodiment may be implemented. In this example, aircraft 1100 is produced by aircraft manufacturing and service method 1000 in FIG. 10 and may include airframe 1102 with a plurality of systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative embodiments may be applied to other industries, such as the automotive industry.

The method and apparatus embodied herein may be employed during at least one of the stages of aircraft manufacturing and service method 1000 in FIG. 10. One or more illustrative embodiments may be used during component and subassembly manufacturing 1006. For example, sealing assembly 212 of FIG. 2 may be used to seal a fastener during component and subassembly manufacturing 1006. Further, sealing assembly 212 may also be used to seal a fastener during maintenance and service 1014.

The method and apparatus presented may reduce the amount of time needed to seal a fastener. Yet further, the presented sealing assembly may reduce the training or experience to seal a fastener. A sealing assembly may seal a fastener by being pressed over the fastener. Pressing a sealing assembly over a fastener may be performed manually or by a robotic system in less than a minute. In some illustrative examples, a sealing assembly may be pressed over a fastener in ten seconds or less.

By using a pre-formed housing, excess sealant may not occur. As a result, the presented sealing assembly may not have sealant shaping, blending, or sealant removal steps. By eliminating sealant shaping, blending, or sealant removal steps, sealing a fastener may have a lower sealing time.

The method and apparatus presented may also reduce the amount of time to manufacture a fuel tank system. A sealing assembly may be applied over an end of a fastener. By using a sealing assembly such as a pre-molded housing, a fastener may be sealed in less time than manually applying conventional seal caps. Manually applying conventional seal caps may take up to twenty minutes each. The time required to apply a conventional seal cap may be related to at least one of the location within the fuel tank system, the size of the end to be covered, the desired surface treatments, or other factors.

By using a sealing assembly, the application processes may be reduced to less than a minute for each fastener. Thus, sealing time for the fasteners may also be reduced. By reducing sealing time, manufacturing time of the fuel tank system may be reduced. By reducing sealing time, manufacturing time of the fuel tank system may be reduced by hundreds of hours. In some illustrative examples, manufacturing time of the fuel tank system may be reduced by more than 1,000 hours.

Still further, by providing transparent sealing assemblies, inspection time may be reduced. By reducing inspection time, manufacturing time may be further reduced.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a housing having a base and a cap, wherein the cap covers a portion of a fastener extending through a surface, wherein the housing applies suction to the surface; and
   a number of self-locking flanges that extend inwardly in a generally radial direction from the housing into an interior of the housing in a first portion and then curve upward into a second portion that comprises a free end extending away from the first portion and from a curve where the first portion and the second portion meet, wherein the number of self-locking flanges engage a non-threaded portion of the fastener at the curve, wherein the number of self-locking flanges are integral to the housing and no part of the housing contacts the fastener other than the number of self-locking flanges.

2. The apparatus of claim 1, wherein the housing is formed of a thermoplastic elastomeric material.

3. The apparatus of claim 1, wherein the housing covers an end of the fastener extending from the surface.

4. The apparatus of claim 3, wherein a space between the housing and the surface has a lower air pressure than an air pressure outside of the housing.

5. The apparatus of claim 3, wherein the housing is formed of a polymeric material selected to protect the fastener from energy caused by an electromagnetic event.

6. The apparatus of claim 1, wherein the number of self-locking flanges hold the housing in place relative to the fastener.

7. The apparatus of claim 1, wherein the number of self-locking flanges center the housing relative to the fastener.

8. The apparatus of claim 1 further comprising:
an adhesive between the base of the housing and the surface.

9. A method of sealing a fastener that extends through a surface, the method comprising:
pressing a housing over an end of the fastener such that a portion of the housing conforms to a portion of the fastener, the housing including a base and a cap;
holding the housing over the fastener with suction applied by the housing to the surface; and
wherein a number of self-locking flanges extend inwardly in a generally radial direction from the housing into an interior of the housing in a first portion and then curve upward into a second portion that comprises a free end extending away from the first portion and from a curve where the first portion and the second portion meet;
wherein pressing the housing over the end of the fastener comprises applying the housing such that the number of self-locking flanges engage a non-threaded portion of the fastener at the curve; and
wherein the number of self-locking flanges are integral to the housing and no part of the housing contacts the fastener other than the number of self-locking flanges.

10. The method of claim 9 further comprising:
applying an adhesive to the base of the housing.

11. The method of claim 10, wherein the suction holds the housing relative to the fastener while the adhesive between the housing and the surface cures.

12. The method of claim 11, wherein the number of self-locking flanges engaging the fastener holds the housing relative to the fastener while an adhesive between the housing and the surface cures.

13. The method of claim 9 further comprising:
heating the base such that a thermoplastic elastomeric material of the base bonds to the surface.

* * * * *